(12) United States Patent
Varma

(10) Patent No.: US 7,590,102 B2
(45) Date of Patent: *Sep. 15, 2009

(54) MULTI-STAGE PACKET SWITCHING SYSTEM

(75) Inventor: Anujan Varma, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 670 days.

This patent is subject to a terminal disclaimer.

(21) Appl. No.: 11/044,242

(22) Filed: Jan. 27, 2005

(65) Prior Publication Data

US 2006/0165098 A1    Jul. 27, 2006

(51) Int. Cl.
*H04L 12/28* (2006.01)
*H04L 12/56* (2006.01)
(52) U.S. Cl. .................... 370/351; 370/397; 398/43; 398/45; 398/48; 398/56
(58) Field of Classification Search ................. 370/351, 370/388, 391; 379/271, 272, 219, 220
See application file for complete search history.

(56) References Cited

U.S. PATENT DOCUMENTS

| | | | |
|---|---|---|---|
| 5,499,374 | A | 3/1996 | Di Giulio et al. |
| 5,689,506 | A | 11/1997 | Chiussi et al. |
| 5,703,879 | A | 12/1997 | Proctor et al. |
| 5,768,257 | A | 6/1998 | Khacherian et al. |
| 6,335,992 | B1 * | 1/2002 | Bala et al. ...................... 385/17 |
| 6,418,115 | B1 | 7/2002 | Iino et al. |
| 6,466,343 | B1 | 10/2002 | Lahat et al. |
| 6,665,495 | B1 * | 12/2003 | Aicklen et al. ................. 398/54 |
| 6,690,851 | B1 | 2/2004 | Guilfoyle |
| 6,888,848 | B2 | 5/2005 | Beshai et al. |
| 6,940,851 | B2 | 9/2005 | Oki et al. |
| 6,990,063 | B1 | 1/2006 | Lenoski et al. |
| 6,999,413 | B2 * | 2/2006 | Moriwaki et al. ........... 370/228 |
| 7,088,710 | B1 | 8/2006 | Johnson et al. |
| 7,489,625 | B2 | 2/2009 | Varma |

(Continued)

FOREIGN PATENT DOCUMENTS

WO    WO-0076256 A1    12/2000

(Continued)

OTHER PUBLICATIONS

"Written Opinion of the International Searching Authority", PCT/US2006/001921, 9 pgs.

(Continued)

*Primary Examiner*—Ayaz R Sheikh
*Assistant Examiner*—Blanche Wong
(74) *Attorney, Agent, or Firm*—Ryder IP Law; Douglas J. Ryder

(57) ABSTRACT

In general, in one aspect, the disclosure describes a multi-stage switch having at least one ingress switch module to receive data and to generate frames that are transmitted as a wavelength division multiplexed signal. The multi-stage switch further includes a core switch module operatively connected to receive the wavelength division multiplexed signal from the at least one ingress switch module and to switch the frames. The multi-stage switch additionally includes at least one egress switch module to receive the wavelength division multiplexed signal from the core switch module and to transmit data.

26 Claims, 15 Drawing Sheets

U.S. PATENT DOCUMENTS

| | | | |
|---|---|---|---|
| 2002/0085578 | A1 | 7/2002 | Dell et al. |
| 2002/0131412 | A1 | 9/2002 | Shah et al. |
| 2002/0136484 | A1 | 9/2002 | MacDonald |
| 2002/0197001 | A1 | 12/2002 | Hayashi et al. |
| 2005/0031250 | A1* | 2/2005 | Schroeder .................... 385/16 |
| 2005/0243825 | A1 | 11/2005 | Bitar et al. |
| 2006/0165111 | A1 | 7/2006 | Varma |
| 2006/0165112 | A1 | 7/2006 | Varma |
| 2007/0171900 | A1 | 7/2007 | Beshai et al. |

FOREIGN PATENT DOCUMENTS

| | | | |
|---|---|---|---|
| WO | WO-2006081128 | A1 | 8/2006 |
| WO | WO-2006081129 | A1 | 8/2006 |

OTHER PUBLICATIONS

"Written Opinion of the International Searching Authority", PCT/US2006/001920, 8 pgs.

"Search Report PCT/US2006/001920", 11 pages.

"Search Report PCT/US2006/001921", 13 pages.

Chiussi, F. M., "Scalable Electronic Packet Switches", *IEEE Journal on Selected areas in Communication*, 21(4), (May 1, 2003), 486-500.

Varma, Anujan, et al., "Chapter 4: Theory of Multistage Interconnection Networks", *Interconnection Networks for Multiprocessors and Multicomputers: Theory and Practice, IEEE Computer Society Press*, 1993, 104-175.

Varma, Anujan, et al., "Chapter 7: Fault-Tolerance and Reliability", *Interconnection Networks for Multiprocessors and Multicomputers: Theory and Practice, IEEE Computer Society Press*, 1993, 296-303.

Varma, Anujan, "Multi-Stage Packet Switching System with Alternate Traffic Routing", U.S. Appl. No. 11/044,096, filed Jan. 27, 2005, 31.

Varma, Anujan, "Replication of Multicast Data Packets In A Multi-Stage Switching System", U.S. Appl. No. 11/044,095, filed Jan. 27, 2005, 39.

Nadir, F. M., "A Survey Of Data Multicast Techniques, Architectures, and Algorithms", IEEE Communications Magazine, (Sep. 2001), pp. 165-166.

* cited by examiner

| NUMBER OF FRAMES OF DATA QUEUED | 4-BIT ENCODING |
|---|---|
| EMPTY | 0000 |
| 0.0 - 0.25 FRAME | 0001 |
| 0.25 - 0.5 FRAME | 0010 |
| 0.5 - 0.75 FRAME | 0011 |
| 0.75 - 1.0 FRAME | 0100 |
| 1.0 - 1.25 FRAME | 0101 |
| 1.25 - 1.5 FRAME | 0110 |
| 1.5 - 1.75 FRAME | 0111 |
| 1.75 - 2.0 FRAME | 1000 |
| 2.0 - 2.25 FRAME | 1001 |
| 2.25 - 2.5 FRAME | 1010 |
| 2.5 - 2.75 FRAME | 1011 |
| 2.75 - 3.0 FRAME | 1100 |
| 3.0 - 3.25 FRAME | 1101 |
| 3.25 - 3.50 FRAME | 1110 |
| > 3.50 FRAME | 1111 |

*FIG. 7*

MULTI-STAGE PACKET SWITCHING SYSTEM

BACKGROUND

Store-and forward devices (e.g., switches and routers) are used in packet networks, such as the Internet, for directing traffic at interconnection points. These switches and routers include switching fabrics which range from a simple bus-based fabric to a fabric based on crossbar (or crosspoint) switching devices. The choice of fabric depends on the design parameters and requirements of the switch or router, such as the port rate, maximum number of ports in the system, performance requirements, reliability/availability requirements, packaging constraints, etc. Crossbar-based fabrics are the preferred choice for high-performance routers and switches because of their ability to provide high switching throughputs.

A typical switch or router contains a set of interfaces or ports, each of which connects to an external link. The interfaces generally reside on a set of circuit boards, called "line cards" or "port interface cards". A packet arriving from an external link first passes through a port interface in the line card. The port interface may be a framer, a medium access control device, etc. The packet is then processed by a packet processor and traffic manager device, which provides the functions of forwarding, classification and queuing based on its class of service, etc. The switching fabric receives the packet and forwards it to the line card corresponding to its destination port (which may be more than one for a multicast packet being sent to multiple destinations). The switching fabric thus provides the re-configurable data paths over which packets can be transported from one port to another within the router or switch.

A general crossbar-based packet switching fabric consists of a crossbar switching matrix, a fabric scheduler, and input buffers to hold arriving packets. The crossbar matrix is logically organized as an array of N×N switching points, thus enabling any of the packets arriving at any of the N input ports to be switched to any of the N output ports. These switching points are configured by the fabric scheduler at packet boundaries. Typically, the packets are switched through the crossbar switching matrix in batches, where a batch consists of at most one packet selected from each input port in such a way that no more than one of the packets is destined for each output port.

In a general crossbar-based switching fabric each of the packets arriving into one of the input buffers has a header containing the destination port number where it needs to be switched. The fabric scheduler periodically reads this information from the headers of the packets stored in the input buffers and schedules a new batch of packets to be transferred through the crossbar matrix. Because each of the output ports is distinct, the fabric scheduler can schedule the packets in a batch (a maximum of N packets) for transfer in parallel across the crossbar switching matrix. While the packets from a batch are being transferred through the crossbar, the scheduler can select the packets to form the next batch, so that the transmission can be nearly continuous. At the end of each batch of packets, the fabric scheduler reconfigures the crossbar switching matrix so as to connect each input port to the correct output port for the next packet.

Single crossbar switch fabrics are difficult to scale to a large number of ports because of the complexity of implementing a large crossbar matrix (the complexity is of the order of $N^2$, where N is the number of ports); heat dissipation; and simultaneous-switching noise. Thus, large switching fabrics are achieved by cascading multiple crossbar modules in a multistage configuration.

Optical switching is an attractive alternative to electrical switching for high-bandwidth switch fabrics. Optical switches have an optical datapath from an input to an output port, allowing very high capacities. In an electrically controlled optical switch, the switching paths are configured by electrical signals. In addition, the capacity of an optical switch can be multiplied several times by the used of Wavelength Division Multiplexing ("WDM"). With WDM, many optical signals carrying separate data streams can be transmitted simultaneously over the datapath by assigning each signal a different optical wavelength. However, reconfiguring the datapaths of optical switches takes longer than in an electronic switching device. This makes them difficult to use in a conventional packet switch, where the datapaths are rearranged at packet intervals.

BRIEF DESCRIPTION OF THE DRAWINGS

The features and advantages of the various embodiments will become apparent from the following detailed description in which:

FIG. 7 illustrates an exemplary encoding scheme for quantizing the amount of data based on frames, according to one embodiment;

DETAILED DESCRIPTION

Figure 1:
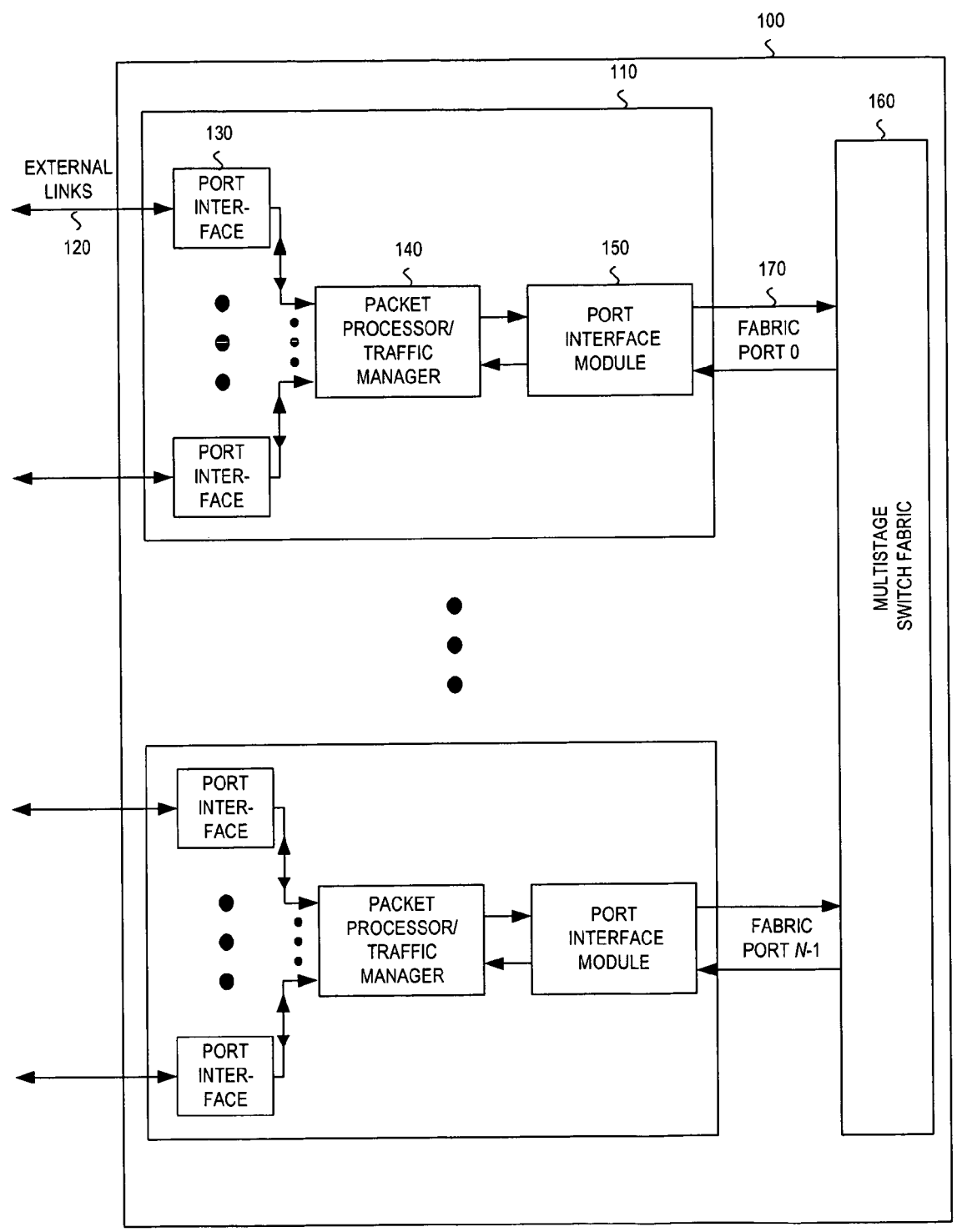
FIG. 1 illustrates an exemplary block diagram of a switching system, according to one embodiment.

FIG. 1 illustrates an exemplary block diagram of a switching system 100. The switching system 100 includes a plurality of port interface modules 110 and a multistage switch fabric 160. The multistage switch fabric 160 has a plurality of ports corresponding to the plurality of interface modules 110. The port interface modules 110 include port interfaces 130, packet processor/traffic managers 140, and fabric port interface modules 150. The interface modules 110 receive packets from external links 120 at the port interfaces 130. The packet processor/traffic manager 140 receives the packets from the port interfaces 130, processes the packets, determines a fabric port number associated with the packet (from a header lookup), and attaches this information to the packet for use by the multistage switch fabric 160. The fabric port interface modules 150 receive the packets from the packet processor/traffic manager 140 and send the packet(s) to the multistage switch fabric 160. The multistage switch fabric 160 switches the packets for transfer to another interface module 110. The links between the fabric port interface modules 150 and the multistage switch fabric 160 are known as fabric ports 170.

The fabric port interface modules 150 receive packets arriving from the multistage switch fabric 160 via a fabric port 170 and pass them on to the packet processor/traffic manager 140 for any processing needed on the egress side. The port interfaces 130 transmit the packets out on the external links 120. A fabric port 170 may aggregate traffic from more than one external link associated with a line card, so a one-to-one correlation is not necessary.

The parts of the port interface modules 150 that transmit data to the multi-stage switch fabric 160 are referred to as ingress port interface modules and the parts of the port interface modules 150 that receive data from the multi-stage switch fabric 160 are referred to as egress port interface modules. A pair of ingress and egress port interface modules together forms the fabric port interface 150. Such a pair of ingress and egress port interface modules is associated with each fabric port 170. When used herein the term fabric port 170 may refer to an ingress port interface module and/or an egress port interface module. An ingress port interface module may be referred to as an ingress fabric interface module, a source fabric port, a source port, an ingress fabric port, an ingress port, a fabric port, or an input port. Likewise an egress port interface module may be referred to as an egress fabric interface module, a destination fabric port, a destination port, an egress fabric port, an egress port, a fabric port, or an output port.

Figure 2:
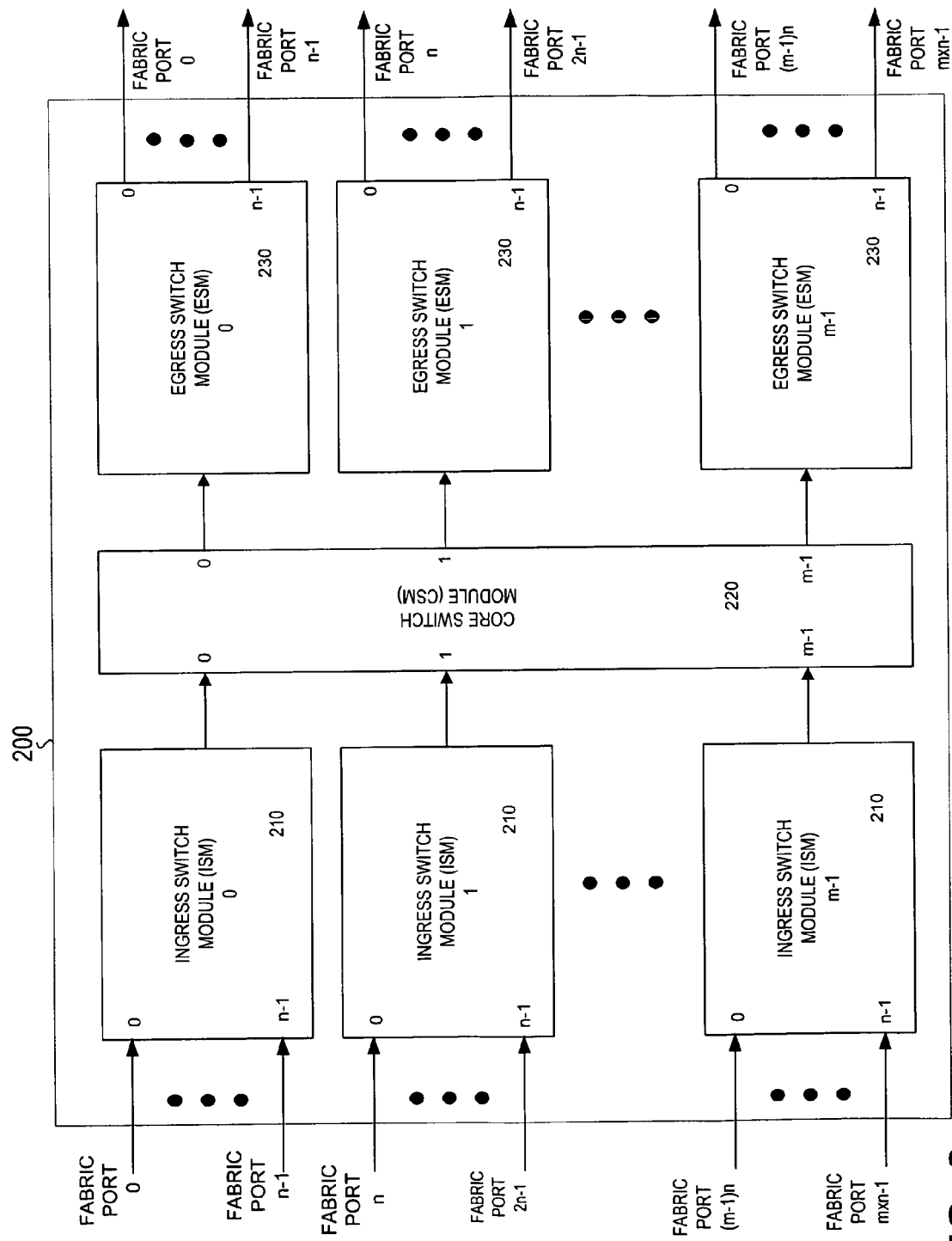
FIG. 2 illustrates an exemplary block diagram of a multistage switch fabric, according to one embodiment.

FIG. 2 illustrates an exemplary block diagram of a multi-stage switch fabric 200. The multi-stage switch fabric 200 comprises a three-stage switch fabric having one or more Ingress Switch Modules (ISMs) 210 in the first stage, a Core Switch Module (CSM) 220 in the second stage, and one or more Egress Switch Modules (ESMs) 230 in the third stage. According to one embodiment, the ISMs 210 and the ESMs 230 are electronic switch modules and the CSM 220 is an electronic or optical switch module. In an optical switch module, the data path remains optical from an input to an output, allowing very high capacities. According to one embodiment, the optical switch is electrically-controlled, that is, the switching paths are configured by electrical signals. Such a switch behaves logically like an electronic crossbar switch with no internal buffering (sometimes called a "pass-through" crossbar device), except that the data paths are all-optical.

The ISM 210 receives packet streams from the fabric port interface modules on the interface cards (e.g., 150 of FIG. 1), and concentrates the packet streams for switching through the CSM 220. According to one embodiment, the concentrated signal is transmitted in the form of a wavelength-division multiplexed (WDM) optical signal, consisting of multiple optical wavelengths, to the CSM 220 over an optical path (for example, optical fiber). With WDM, many optical signals carrying separate data streams can be transmitted simultaneously over the data path by assigning each signal a different optical wavelength. This enables an optical switch to act as logical equivalent of many parallel electronic crossbar planes, each corresponding to a distinct wavelength. After undergoing switching in the optical switch, the WDM signal reaches an ESM 230 via another optical path (for example, optical fiber). The ESM 230 separates the channels of the WDM signal, converts them into electronic form, and switches the individual packets to their addressed destination port interface modules.

According to one embodiment, the CSM 220 can comprise an electronic pass-through crossbar. In such an embodiment, a physical electronic crossbar device may replace the optical switching function for each wavelength used to transfer data in the WDM signal. For example, if the WDM signal employs four wavelength channels to pass data, then the CSM electronic switch will have four distinct physical crossbar devices, each switching the data stream associated with one of the wavelengths in the design based on optical switch.

As illustrated, a first stage has m ISMs 210 labeled 0 through m−1 and each ISM 210 has n ports (labeled 0 through n−1 for each ISM 210 and 0 through m×n−1 for the overall multi-stage switch fabric 200). The middle stage CSM 220 is a single m×m optical crossbar switch capable of switching WDM data streams. Each ISM 210 concentrates the data streams from the associated ports into a single WDM stream with n channels. While, in this example, the number of channels is identical to the number of ports associated with each ISM, alternate embodiments may choose the number of channels to be either greater than or less than the number of ports n per ISM. Having a greater number of channels than ports may provide improved throughput and compensate for scheduling inefficiencies while a number of channels less than the number of ports may result in some performance loss.

The ESM 230 de-multiplexes the WDM data stream received from the CSM 220 into its constituent channels and converts the packet streams into electronic signals. The packets from these data streams are then switched through an electronic crossbar to their intended destinations, and delivered to the corresponding port interface module.

Each of the switch modules (ISM 210, CSM 220, ESM 230) may be controlled by a separate scheduler. Each scheduler is responsible for setting up the switching crossbar within the module at frame boundaries based on requests received from its ports. The channels within the WDM stream are advantageously switched as a group by the CSM to one of its ports, but selectively routing each wavelength channel to a distinct output is also possible.

Figure 3:
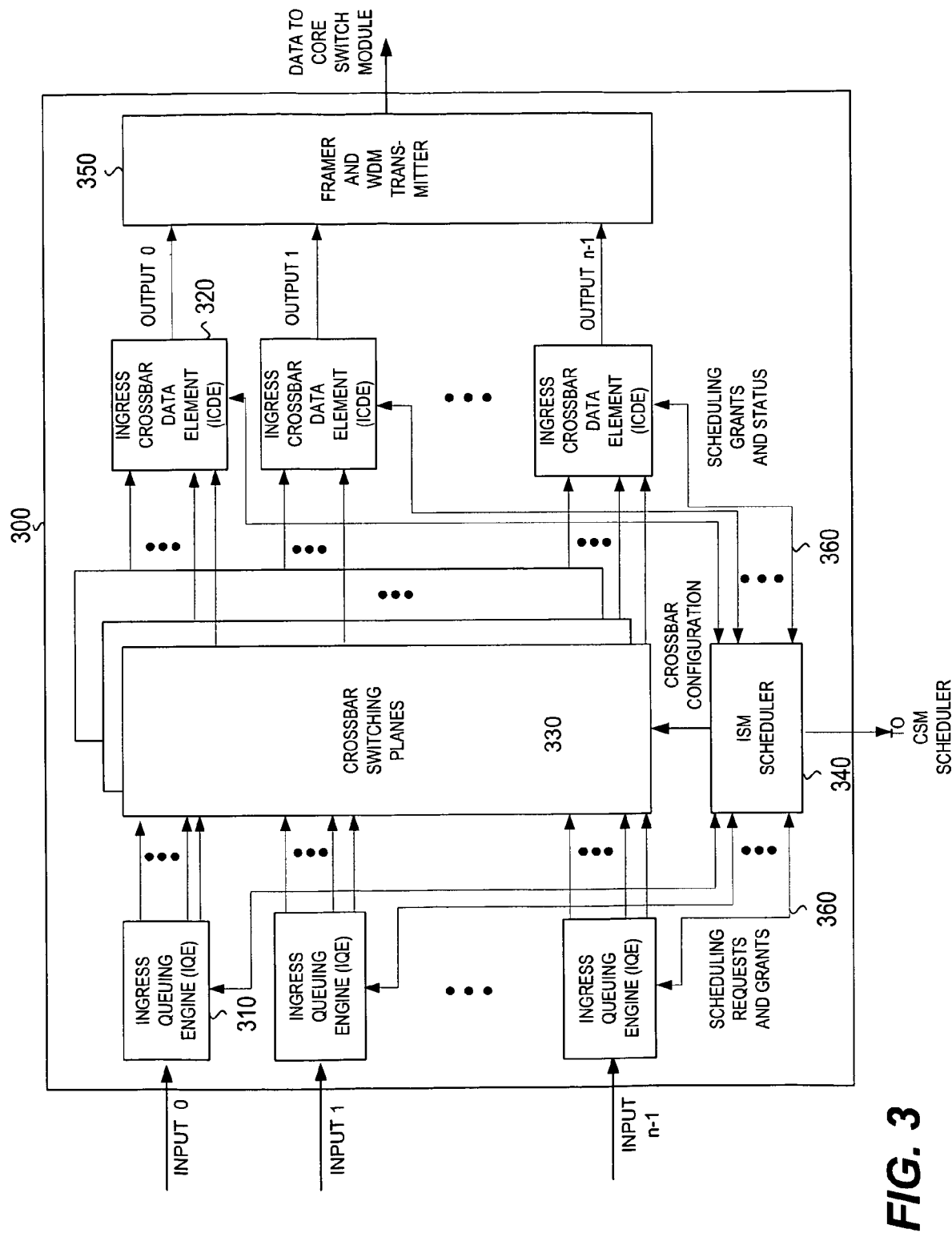
FIG. 3 illustrates an exemplary block diagram of an Ingress Switching Module (ISM), according to one embodiment.

FIG. 3 illustrates an exemplary block diagram of an ISM 300. The ISM 300 includes one Ingress Queuing Engine (IQE) 310 per port, one Ingress Crossbar Data Element (ICDE) 320 per port, crossbar switching plane(s) 330, an ISM scheduler 340, and a framer and WDM transmitter (FWT) 350. The IQE 310 receives data from its corresponding fabric port as variable-size packets. The IQE 310 aggregates the packets into frames (discussed in more detail later) for switching via the crossbar switching planes 330. According to one embodiment, the crossbar switching planes 330 are electronic crossbars. The frames arrive in the ICDE 320 and the packet segments are extracted from the frame. The ICDE 320 receives the packets and re-frames the packets for transmission over the CSM. The FWT 350 then converts the frames formed by the ICDE 320 into optical signals, transmits the frame from each ICDE at a different wavelength, and combines them to form a WDM signal to transmit to the CSM (e.g., 220 of FIG. 2).

The ISM scheduler 340 is connected to the IQEs 310 and the ICDEs 320. According to one embodiment, the IQEs 310 and the ICDEs 320 are connected to the ISM scheduler 340 through a full-duplex path, for example, a pair of serial links 360 (one in each direction). Scheduling requests from the IQEs 310, and the grants sent by the ISM scheduler 340 in response, are sent through these links.

The IQEs 310 store the packets arriving from the interface cards in a set of queues. Each IQE 310 maintains a separate queue (isolated from each other) for packets destined to each ICDE 320. In addition, the packets destined to a specific ICDE 320 can further be distributed into multiple queues based on their class of service or relative priority level. These queues may be referred to as virtual output queues. The packets may be broken down into segments and the segments stored in the queues. The segments can be variable size but are limited to a maximum size.

Figure 4:
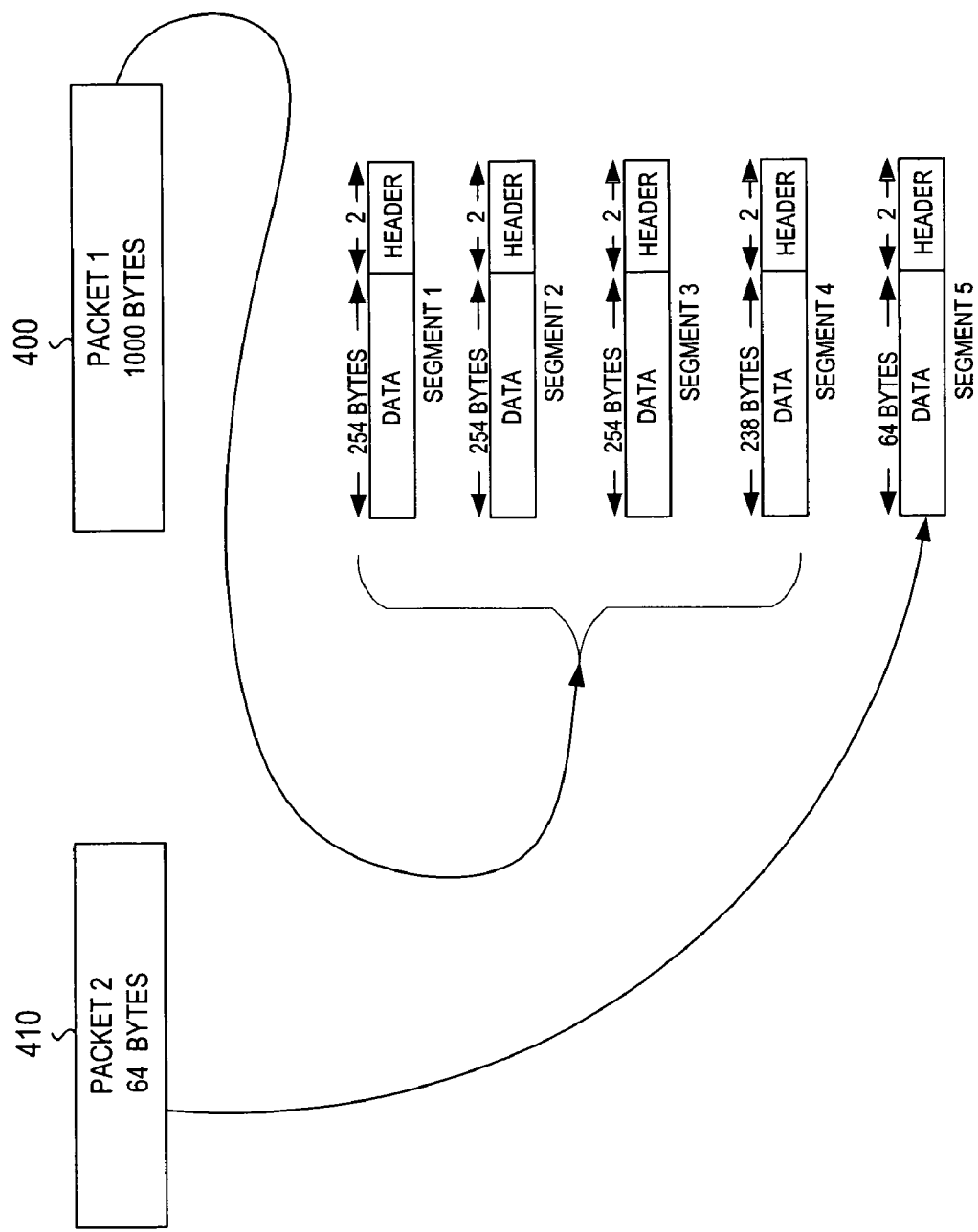
FIG. 4 illustrates an exemplary distribution of packets being stored as segments in a single queue, according to one embodiment.

FIG. 4 illustrates an exemplary distribution of packets being stored as segments in a single queue (corresponding to specific destination port and priority level) within an ingress fabric interface module. Two packets are received from the interface card. The first packet 400 is 1000 bytes and the second packet 410 is 64 bytes. The maximum size of a segment is 256 bytes (254 data bytes and a 2 byte segment header). The first packet (1000 bytes) 400 is broken into three 254 byte maximum data size segments (3×254=762 bytes) and a fourth segment of 238 bytes of data. Each of the four segments has a two byte segment header added and the overall segments (data and header) are stored in the queue. Accordingly, the four overall segments include three 256 byte segments and a 240 byte segment. The second packet (64 bytes) 410 is less than the maximum segment size so it has the two byte header appended to it and is saved in the queue as a 66 byte segment.

The segment header identifies the queue in which the segment is to be placed upon its arrival in the egress fabric interface module. The number of queues is dependent on number of priority levels (or class of services) associated with the packet. Furthermore, the number of queues may also be dependent on number of ingress fabric interface modules that can send data to the egress fabric interface module. For example, if the egress fabric interface module receives data from 8 ingress fabric interface modules and each ingress fabric interface module supports 4 levels of priority for packets to that egress fabric interface module, then the segments arriving at the egress fabric interface module may be placed in one of 32 queues (8 ingress fabric interface modules×4 priorities per ingress module). Therefore, a minimum of 5 bits are needed in the segment header to identify one of the 32 queues. The segment header also includes an "End of Packet" (EOP) bit to indicate the position of the segment within the packet where it came from. The EOP bit is set to 1 for the last segment of a packet, and 0 for the other segments. This enables the egress modules to detect the end of a packet.

Figure 5:
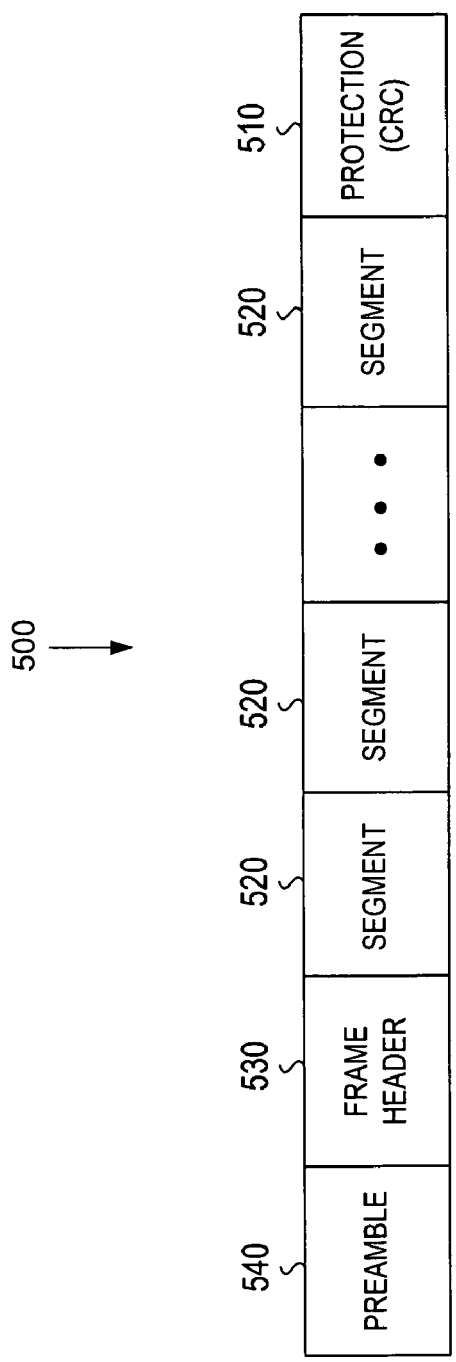
FIG. 5 illustrates an exemplary format of a frame made up of multiple segments, according to one embodiment.

The segments stored in the queues are aggregated into frames by an IQE (e.g., 310 of FIG. 3) before transmission to a crossbar matrix (e.g., 330 of FIG. 3). FIG. 5 illustrates an exemplary format of a frame 500 (made up of multiple segments) being transmitted by an IQE to an ICDE via the crossbar matrix. The frame 500 starts with a preamble 540, frame header 530, followed by one or more segments 520, and a protection/error detection field 510 (e.g., a Cyclic Redundancy Code (CRC)). The frame header 530 contains fields identifying the ingress and egress fabric interface modules associated with the frame, and other optional information. This information is used by the ICDE for data identification and for error checking. The maximum size of the frame is a design parameter. The preamble 540 is for establishing synchronization at the ICDE. The time taken to transmit the maximum-size frame is referred to as the "frame period." This interval is the same as a scheduling interval for the ISM scheduler (discussed in further detail later). The frames transmitted to the crossbar in ISM will be referred to as "ISM frame" to distinguish it from the frames used within the ESM, and the frames transmitted through the CSM.

The IQE constructs a frame by de-queuing one or more segments from its queues when instructed to do so by a grant from the ISM scheduler. Such a grant arrives at each IQE during each frame period. On receiving the grant, the scheduler first identifies the subset of queues from which data need to be de-queued, based on the destination fabric port number specified by the grant. If there are multiple queues associated with the specific destination, the ingress module chooses one or more queues from this subset based on a scheduling discipline. For example, if each of the queues in the subset corresponds to a distinct priority level, then the queues may be serviced in the order of priorities, starting from the highest priority queue, proceeding to the next priority level when the current priority level queue is empty. This de-queuing of segments proceeds until the frame is full. Each frame so constructed may not have the same size, but will be within the maximum size specified.

While constructing the frame, the segments from multiple packets may be interleaved within a frame. Because the segment header provides identifying information for re-assembling the segments into the original packets, data integrity is maintained. It is advantageous that the order of segments from the same packet be preserved.

When there is only a single crossbar switching plane present within the ISM, the frame is transmitted in bit-serial fashion through the crossbar plane. When multiple crossbar planes are used, the contents of the frame are striped over the available crossbar planes. Striping may be performed at the bit, byte, or word level. Additional channels may be used for protection, such as error detection and correction.

The frame period of the ISM frame can be chosen independent of the maximum packet size in the system. According to one embodiment, the frame period is chosen such that a frame can carry several maximum-size segments and is compatible with the reconfiguration time of the crossbar data path.

It is advantageous to consider the overhead in synchronizing the receivers in the ICDE with the data streams at the start of a frame when selecting the frame period. A data stream is broken at the end of a frame. A new frame arriving at the ICDE may be from a different IQE, resulting in a change in frequency and/or phase of the clock associated with the data stream. Thus, the receivers reestablish synchronization at the boundary of every frame. Toward this end, the preamble 540 is positioned at the beginning of each frame 500. The preamble 540 does not carry any data, but only serves to establish synchronization.

Referring back to FIG. 3, the ICDE 320 receives the framed segments from the crossbar planes 330, de-frames the segments and queues the segments based on the ESM number of the destination for that segment. For example, if a segment is addressed to fabric port 50, and fabric port 50 is served by the ESM 2, then the ICDE 320 will queue the segment in its queue number 2. When data is transmitted from the ISM 300 to the CSM (e.g., 220 of FIG. 2), the data is framed by the FWT 350 and the FWT 350 transmits the frames from the ICDEs having data to be transmitted as a WDM signal, where the data from each ICDE is transmitted at a different optical wavelength.

As previously noted, the data arriving at the IQEs 310 is segmented and stored in queues based on destination port and priority level. During each cycle of the frame clock, each of the IQEs 310 transmits information on the segments waiting in its queues to the ISM scheduler 340. This information can be regarded as a set of requests from the IQEs for use of the data path to the crossbar 330. The information provided by each IQE consists of, at a minimum, the addresses of the destination ESM associated with its non-empty queues. The information can optionally include many other attributes, such as the total amount of data queued for each ESM, the "age" of each request (that is, the time interval since data was last transmitted to the specific ESM), etc. In addition, if priority levels are supported, then the information may include the amount of data queued at each priority level for each destination ESM.

The scheduling requests sent from the IQEs to the ISM scheduler during each frame period may be formatted in the form of a request frame. Additional fields may be used for functions such as flow control and error control.

Figure 6:
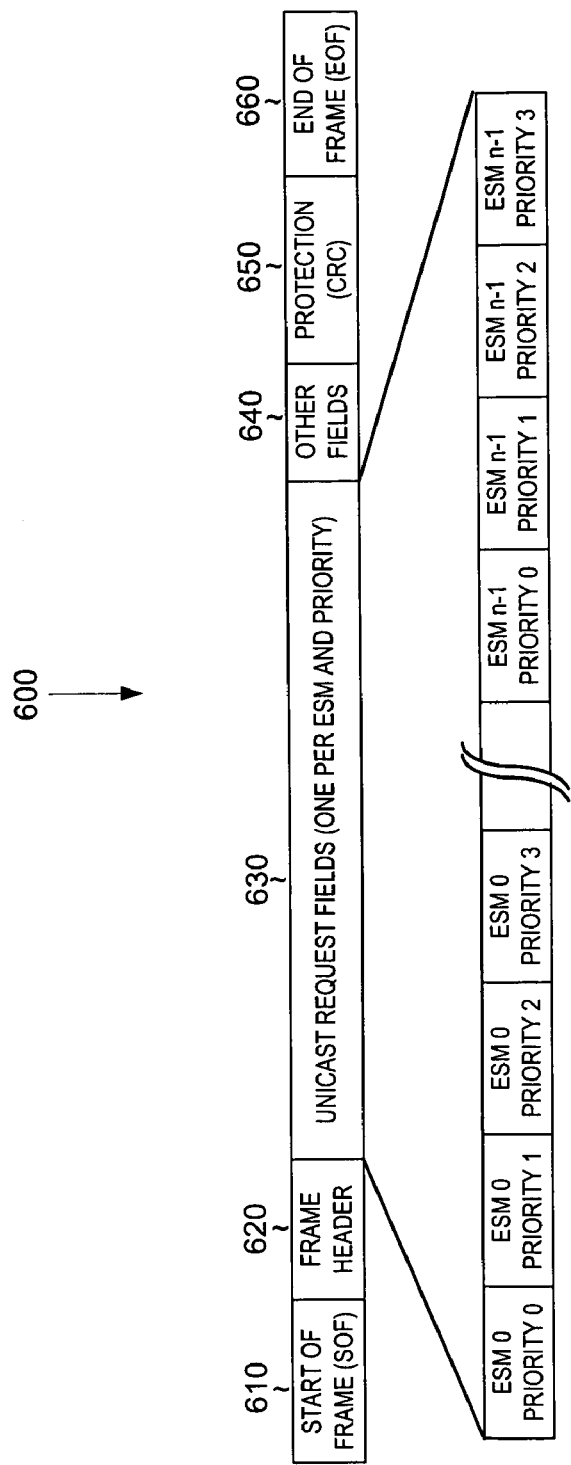
FIG. 6 illustrates an exemplary ISM request frame, according to one embodiment.

FIG. 6 illustrates an exemplary request frame 600 sent by the IQE to the ISM scheduler. The request frame 600 includes a start of frame (SOF) delimiter 610, a header 620, request fields (requests) 630, other fields 640, an error detection/correction field 650, and an end of frame (EOF) delimiter 660. The SOF 610 and EOF 660 fields mark frame boundaries. The header 620 contains a sequence number. The error detection/correction 650 is used to detect transmission errors and may be used to correct errors. According to one embodiment, the error correction/detection 650 is a cyclic redundancy code (CRC). Frames with bad CRC are discarded by the scheduler. Because these requests will automatically be repeated during the following frame periods (requests include total data in queue at time of request which does not include data that has been requested and granted but not yet de-queued—discussed in detail below) no retransmission protocol is required. The other fields 640 may be used for functions such as flow control and error control.

The major part of the request frame 600 is the set of requests 630. According to one embodiment, there is one request for each ESM and priority level. Assuming an example system with 64 ESMs and 4 priority levels, there would be 256 (64 ESMs×4 priorities/ESM) distinct requests 630 in the request frame 600. The requests 630 indicate that there is data in an associated queue available for transmission. The request 630 may summarize the amount of data in the associated queue. The length of the requests 630 (e.g., number of bits) may be chosen taking into account limitations on the total length of the request frame 600, and the granularity of the amount of data in the associated queue needed by the scheduler (scheduling algorithms). For example, the requests 630 may be encoded as 4 bits, thus providing 16 different options for defining the amount of data in the queue. That is, the request 630 can utilize 4 bits to describe the amount of data in the queue. The requests 630 can be encoded in various ways to define the amount of data in the associated queue.

The amount of data in the queue may be described in terms of number of bytes, packets, segments or frames. A packet-based switch fabric could define the amount of data in terms of bytes or packets. A segment-based switch fabric could define the amount of data in terms of bytes, packets, or segments. A frame-based switch fabric could define the amount of data in terms of bytes, packets, segments, or frames. According to one embodiment for a frame-based switch fabric, the amount of data is quantized in terms of the frame period. That is, the request 630 may be encoded to indicate the number of data frames it would take to transport the data within the associated queue over the crossbar planes.

FIG. 7 illustrates an exemplary encoding scheme for quantizing the amount of data based on frames. As illustrated, the scheme identifies the amount of data based on ¼ frames.

Referring back to FIGS. 3 (ISM 300) and 6 (request frame 600), the requests 630 may identify the priority of the data in addition to the amount of data. The ISM scheduler 340 may base its scheduling decisions primarily on the priority of the requests 630. For example, if the request frame 600 indicates that IQE 1 priority 1 has 0.25 frame queued and IQE 2 priority 2 has 1.00 frame queued for ICDE 3, then the ISM scheduler 340 may chose the IQE 310 with the higher priority (IQE 1) in making scheduling decisions for which of the IQEs 310 should transmit data to ICDE 3.

In order to maintain high throughput, the ISM scheduler 340 may also give preference to the amount of data in the queues (e.g., preference to queues having full frames worth of data to send). For example, if the request frame indicates that IQE 1 has only 0.25 frame of priority 1 queued for ICDE 7, while IQE 2 has 0.5 frame of priority 1 data queued for ICDE 7, the ISM scheduler 340 may select the IQE 310 having more data queued (IQE 2) to transmit data to ICDE 7.

When the amount of data for a specific ICDE 320 and priority is equal, the ISM scheduler 340 may look to the total amount of data queued for the ICDE 320. For example, if the request frame indicates that IQE 1 has only 0.25 frame of priority 1 queued for ICDE 9, and that IQE 2 has 0.25 frame of priority 1 and 1.00 frame of priority 2 queued for ICDE 9, then the ISM scheduler 340 may select the IQE 310 having more data queued in total for ICDE 9 (IQE 2) as the amount of data for the highest priority was equal.

The ISM scheduler 340 may also consider the "age" of a request 630 (that is, the number of consecutive cycles during which a request has been pending with no grants given during that time) in making scheduling decisions, so as to prevent starvation for those requests.

Because the ICDEs 320 in an ISM 300 are connected to the same ESM during a frame time of the CSM, the data destined to any ESM can be sent to any of the ICDEs 320 in the ISM 300. The ISM scheduler 340 is responsible for assigning the ICDE 320 destinations for a set of requests received from the IQEs 310 during a given cycle. One constraint on the ISM scheduler 340 in making these assignments is that during a given frame time, each IQE 310 will send data to a distinct ICDE 320. Another constraint is that the scheduler attempts to perform load-balancing across the ICDEs 320. For maximum efficiency, it is advantageous for a frame worth of data to be transferred between a given ICDE 320 and its corresponding ESM when the CSM permits data transfer during a frame time. This enables full utilization of the channels in the CSM and can be achieved by the ISM scheduler 340 keeping track of the amount of data stored in each ICDE 320 for each ESM.

Figure 8:
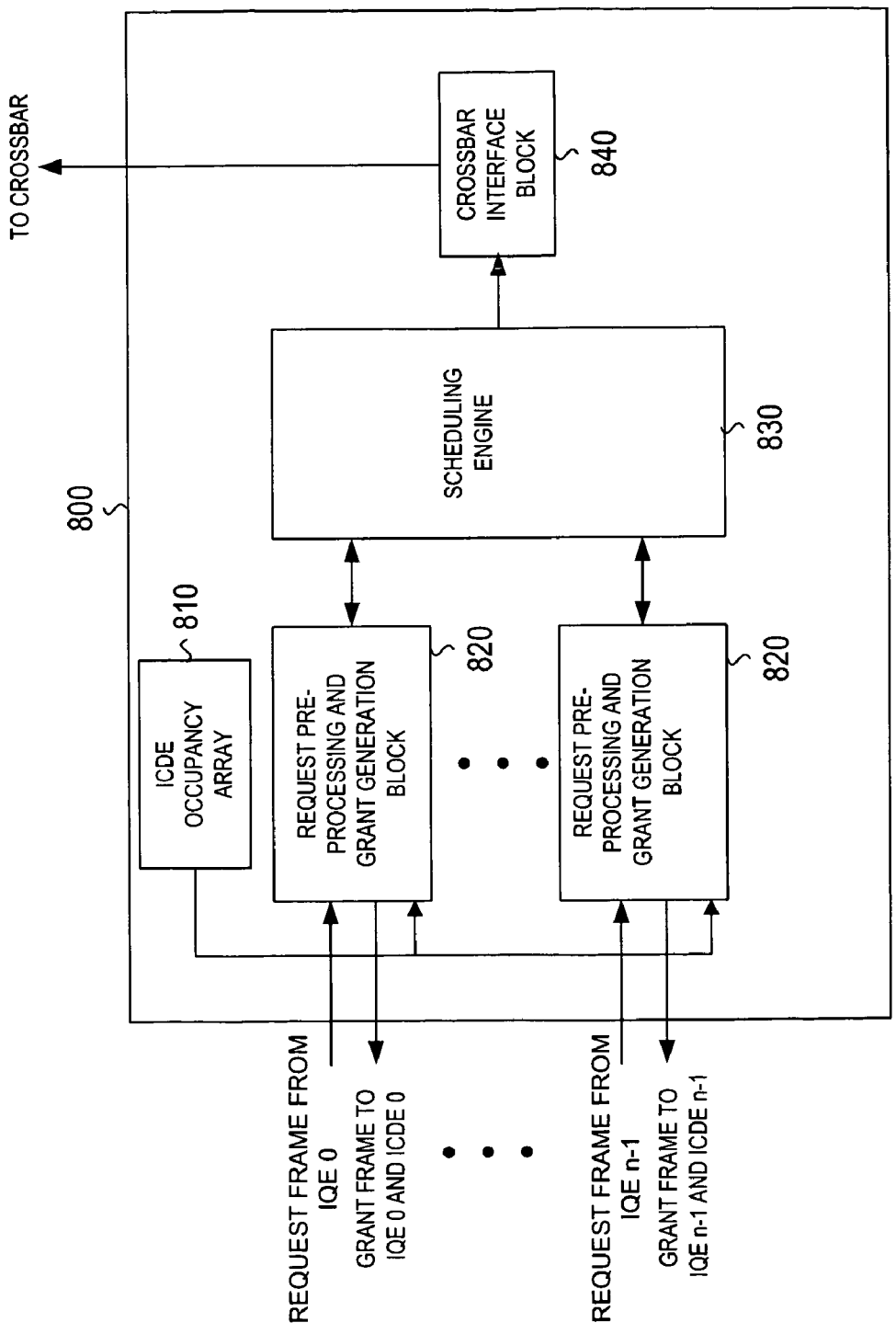
FIG. 8 illustrates an exemplary block diagram of an ISM scheduler, according to one embodiment.

FIG. 8 illustrates an exemplary block diagram of an ISM scheduler 800. The ISM scheduler 800 includes an ICDE occupancy array 810, request pre-processing and grant generation blocks 820, a scheduling engine 830 and a crossbar interface block 840. The ICDE occupancy array 810 has one entry per ICDE per ESM. The ICDE occupancy array 810 facilitates the assignment of ICDEs to the requests from the IQEs. The ICDE occupancy array 810 may be a two-dimensional array indexed by an ICDE address and a destination ESM address. Each entry in the array 810 contains a value representing the amount of data queued in the ICDE for the destination ESM. This value is, at a minimum, a single bit where a value of 0 indicates no data has been queued for the corresponding ESM in the referenced ICDE, and 1 indicating some data has been queued. With more bits, the amount of queued data can be represented more precisely.

The request pre-processing block 820 extracts the requests from request frames received from the IQEs and extracts from each request the ESM index corresponding to the request. The requests may then be passed on to the scheduling engine 830, along with the occupancy values read out from the ICDE occupancy array 810 corresponding to the destination ESM. Eligibility bits are used as "enable" bits during scheduling. That is, if a bit is zero, the corresponding ICDE is not considered for scheduling. After discarding the occupancy values corresponding to these ICDE positions, the scheduler examines the remaining occupancy values to select one of them to assign to the given request. The scheduling engine may utilize several criteria to make this selection. In one embodiment, the scheduling engine 830 may select the ICDE with the smallest occupancy value from the eligible ICDEs. However, because requests arriving from the IQEs are processed in parallel, the scheduling engine 830 also arbitrates among the requests so that each IQE is assigned a different ICDE. This may make it difficult to perform the selection based on the smallest occupancy value. In another embodiment, a weighted matching of the ICDEs is performed, such that smaller occupancy values are preferred over larger ones while performing the matching.

Maintaining the ICDE occupancy values in the ISM scheduler is advantageous for improved load balancing while switching through the CSM. Thus, this occupancy information is transferred to the CSM scheduler during each frame time. The CSM scheduler can then take into account how many ICDEs have data queued for a given ESM before scheduling the CSM. Ideally, the CSM scheduler should connect an ISM to an ESM when the ICDEs associated with the ISM have a full Frame Slice worth of data to send to the ESM.

After performing the ICDE assignments, the scheduler informs the requesting IQE of the address of the assigned ICDE. The requesting IQEs, on receiving the grant message, de-queues the segments from its queues corresponding to the destination ESM specified by the request, and transmits them over the crossbar planes as a frame to the specified ICDE.

In parallel with transmitting the grant messages to the IQEs, the crossbar interface block 840 sets up the crossbar planes to establish the data paths between the IQE and ICDE devices as per the assignment computed.

The scheduling engine 830 also sends a corresponding grant message to the ICDEs selected as destinations in the current assignment. This enables the receiving ICDEs to detect any errors in the setting of the crossbar planes that cause data to be delivered to an incorrect ICDE.

The scheduling engine 830 may perform multiple iterations to match the requesting IQEs with the eligible ICDEs, where a subset of the matching is completed in each iteration. As IQEs and ICDEs are matched, the matched IQEs and ICDEs are removed from the computation, so that only the remaining IQEs and ICDEs are considered in the following iterations. The iterations proceed until all requesting IQEs have been matched, or if no more IQE-ICDE pairs can be matched, or if a certain upper limit on the number of iterations has been reached.

Upon completion of the computation of the matching, the ISM scheduler sends the result to each requesting IQE as a grant message. In one embodiment, grant messages are sent by the ISM scheduler to the IQEs and to the ICDEs by encapsulating them within grant frames. If the IQE and ICDEs corresponding to the same index are packaged together (within the same chip, for example) the grant messages to the IQE and to the ICDE at the same address are sent in the same frame. The message to the IQE identifies the destination ICDE and the message to the ICDE identifies the source IQE.

Figure 9:
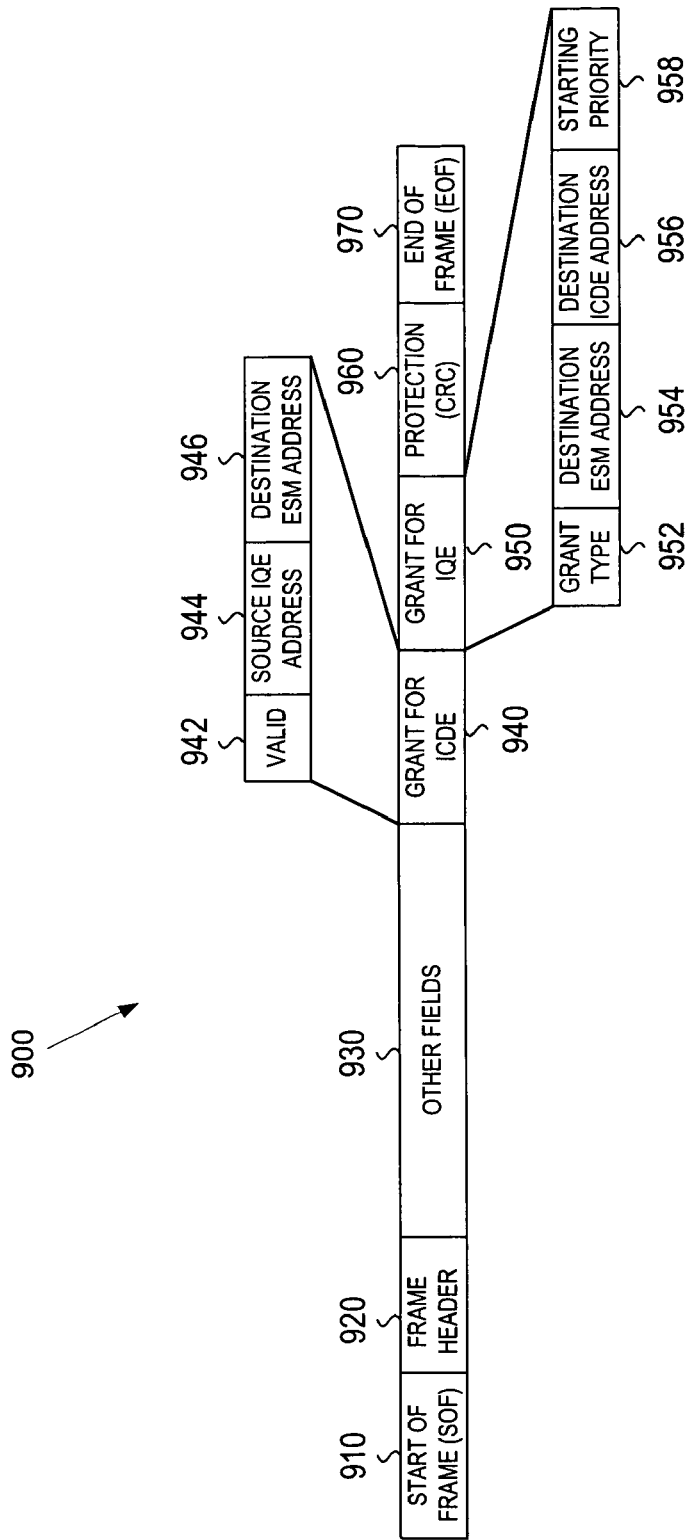
FIG. 9 illustrates an exemplary ISM grant frame, according to one embodiment.

FIG. 9 illustrates an exemplary grant frame 900, combining the grant messages to the IQE and the ICDE associated with a fabric port. The grant frame 900 includes a start of frame (SOF) delimiter 910, a frame header 920, other fields 930, an ICDE grant 940, an IQE grant 950, an error detection/correction field 960, and an end of frame (EOF) delimiter 970. The other fields 930 can be used for communicating other information to the IQEs and the ICDEs, such as flow control status. The error detection/correction field 960 (e.g., a Cyclic Redundancy Code (CRC)) is used to detect errors in the grant frame.

The ICDE grant 940 may include a valid bit 942, a source IQE address 944, and a destination ESM address 946. The valid bit 942 indicates that the field is valid. The source IQE address 944 represents the IQE that the ICDE should be receiving data from. The destination ESM address 946 specifies the address of the ESM associated with the destination port for the data. The destination ESM address 946 is used by the ICDE to identify the queue in which the incoming data is to be inserted.

The IQE grant 950 may include a grant type 952, a destination ESM address 954, a destination ICDE address 956 and a starting priority 958. The grant type 952 specifies the type of grant. Exemplary grant types include: no grant (meaning no grant is indicated in frame) and unicast grant (meaning that the IQE should dequeue from unicast queues). The destination ESM address 954 specifies the address of the ESM associated with the destination port for the data. The destination ESM address 954 is used by the IQE to identify the queue or set of queues to de-queue data from. The destination ICDE address 956 specifies the address of the ICDE to which data is to be transmitted during the next frame period. The information in this field is extracted by the IQE and inserted within the header of the data frame containing the de-queued data, so that the receiving ICDE can compare the address to its own address, to detect any errors in the crossbar setting. The starting priority 958 specifies the starting priority level for de-queuing data. The presence of the starting priority field enables the scheduler to force the IQE to start de-queuing data from a lower priority queue when a higher-priority queue has data. This allows the system to prevent starvation of lower-priority data.

In a large switch fabric with several fabric ports, the IQEs and ICDEs may be distributed over several cards. Likewise, the crossbar data paths may comprise several switching planes located over multiple cards. Also, configuring the entire setting of a crossbar device with a large number of inputs and outputs may take several clock cycles. Thus, the overheads associated with (1) communicating requests to the ISM scheduler, (2) the scheduler's computation of the crossbar setting, (3) communicating the results in the form of grants to the IQEs and ICDEs, and (4) setting up the crossbar planes to correspond to the computed schedule can be significant. Because no data can be transmitted until these operations are completed, a large amount of the switch bandwidth can be potentially lost.

Figure 10:
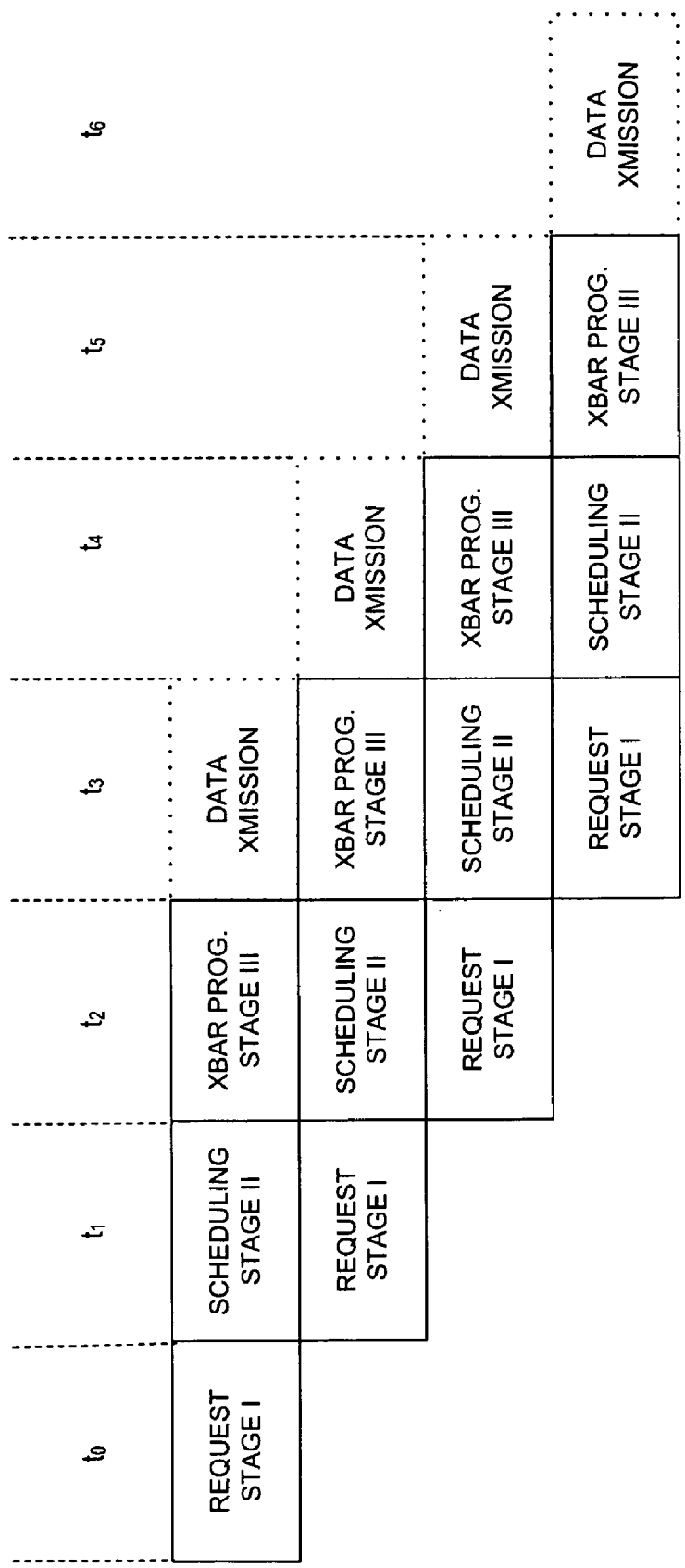
FIG. 10 illustrates an exemplary 4-stage pipeline, according to one embodiment.

In one embodiment, a solution to this problem is to pipeline various operations associated with the system so that they can be overlapped. The basic time unit for system operation is the frame period. Therefore, each pipeline stage may correspond to one frame period, for example. FIG. 10 illustrates an exemplary 4-stage pipeline. The pipeline schedule includes four stages. Stage I is the request stage. During this stage, the IQEs send their requests to the ISM scheduler. The ISM scheduler can perform some pre-processing of the requests in this stage while the requests are being received. Stage II is the schedule stage. During this stage, the ISM scheduler matches the inputs (IQEs) to outputs (ICDEs). At the end of this stage, the scheduler sends a grant message to the IQEs specifying the ICDEs to which it should be sending data. The ISM scheduler may also send the grants to the ICDEs to identify the IQEs from which they are expected to receive data from. Stage III is the crossbar configuration stage. During this stage, the ISM scheduler configures the crossbar planes based on the matching computed during stage II. While the crossbar is being configured, each of the IQEs de-queues data from its queues corresponding to its matched ICDE, and forms a frame. Stage IV is the data transmission stage. During this stage, the IQEs transmit their data frames across the crossbar.

Referring back to FIG. 3, data transmitted out of the ISM 300 into the CSM is also in the form of framed segments, but the size of this frame may be different from that of the ISM frame. In addition, data transmitted through the CSM consists of framed segments from the ICDEs 320 within the ISM 300. A set of framed segments transmitted by a specific ICDE 320 during a CSM frame period is referred to herein as a "CSM Frame Slice" and the combination of segments transmitted by all the ICDEs 320 within an ISM during the CSM frame period is referred to herein as a "CSM Frame".

Figure 11:
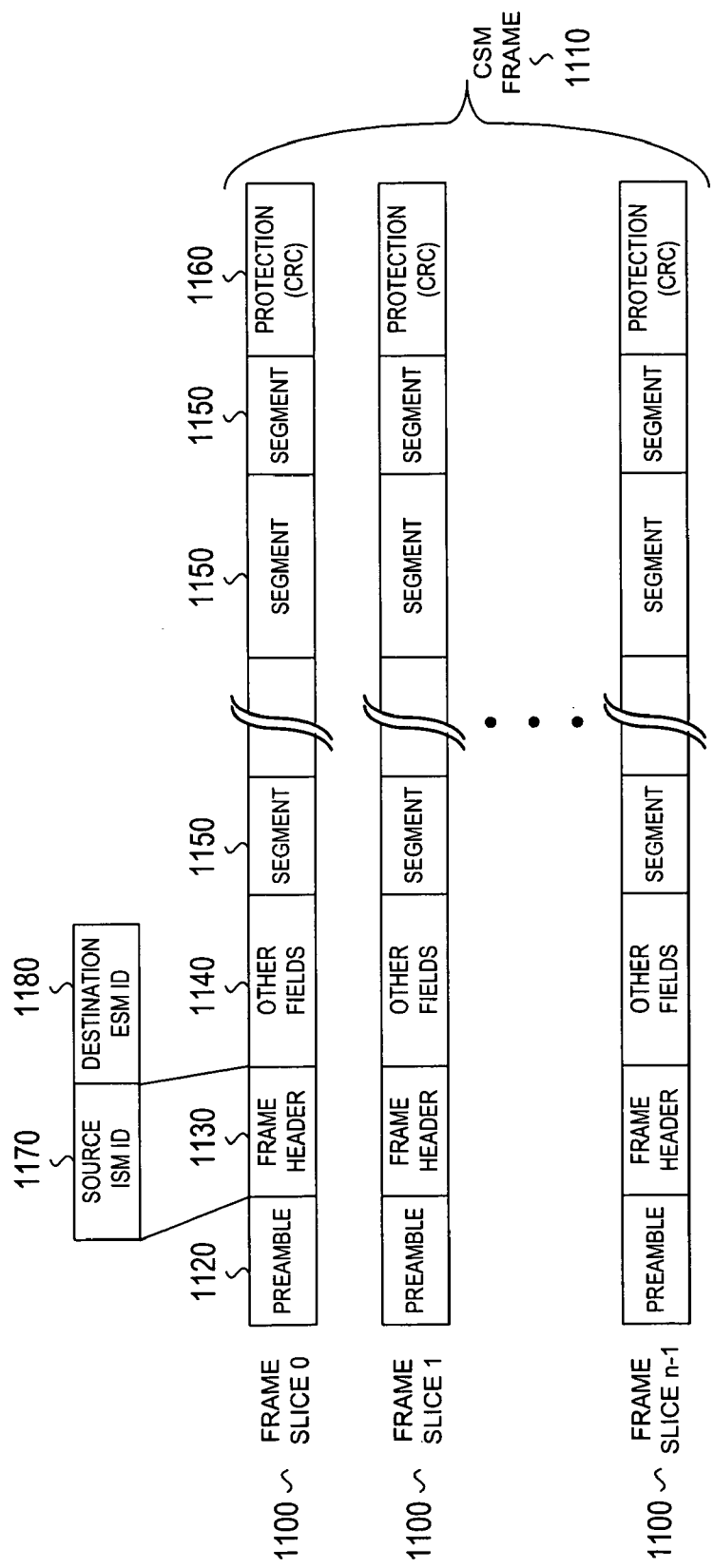
FIG. 11 illustrates exemplary Core Switch Module (CSM) Frame Slices within a CSM Frame, according to one embodiment.

FIG. 11 illustrates exemplary CSM Frame Slices 1100 making up a CSM Frame 1110. As illustrated n frame slices (labeled 0 through n−1) corresponding to the n ICDEs within an ISM make up the CSM Frame 1110. The Frame Slices 1100 making up the CSM Frame 1110 are destined for ports served by a specific ESM. That is, the CSM Frame is being delivered to a specific ESM so that all data being transmitted in the CSM Frame 1110 should be associated with that ESM.

Each of the Frame Slices 1100 has a preamble 1120, a header 1130, other fields 1140, a plurality of segments 1150, and a protection field 1160. The preamble 1120 is for synchronization as discussed earlier. The header 1130 includes an identification of the source ISM 1170 and the destination ESM 1180. It should be noted that frame slices 1100 within the CSM Frame 1110 will have identical ESM destinations 1180. The other fields 1140 may be used for flow control or other functions. The protection field 1160 may be a CRC for error control.

Figure 12:
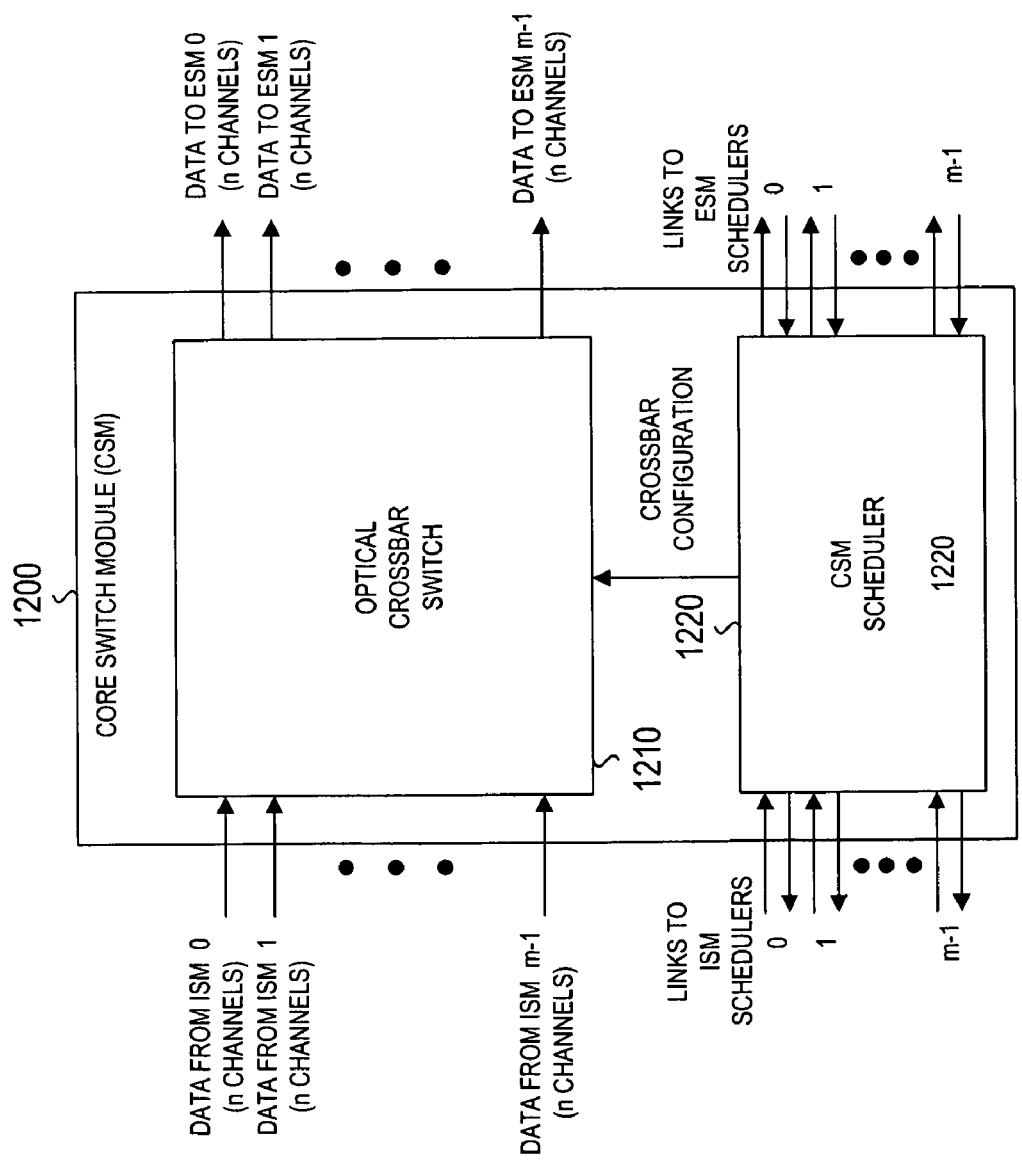
FIG. 12 illustrates an exemplary block diagram of a CSM, according to one embodiment.

FIG. 12 illustrates an exemplary block diagram of a CSM 1200. The CSM 1200 comprises an electrically controlled optical crossbar device 1210 and a CSM scheduler 1220. Electronic crossbar devices may be used in other embodiments. The CSM scheduler 1220, which may be an electronic scheduler in an embodiment, is connected to the ISM schedulers and the ESM schedulers. During each CSM frame period, the CSM scheduler 1220 receives requests from each ISM (through its ISM scheduler) summarizing the amount of data queued for the ESMs. Based on this information, the CSM scheduler 1220 determines the setting of the optical crossbar device 1210 in each frame time. In addition, the computed schedule is also conveyed back to the ISM schedulers (in the form of a grant), which, in turn, set up the ICDs to de-queue data from the appropriate queues and transmit to the optical crossbar device 1210.

The optical crossbar device 1210 receives data from the m ISMs in the system. There are n channels associated with each ISM (e.g., channels numbered channel 0 through channel n−1). The optical cross bar device 1210 switches them together to the same ESM. Thus, during a given frame time, the crossbar may be configured to switch the channels associated with a particular ISM to a particular ESM. Just as in the case of the ISM scheduling operation, the scheduling operation of the CSM 1200 can be pipelined into a series of stages.

Figure 13:
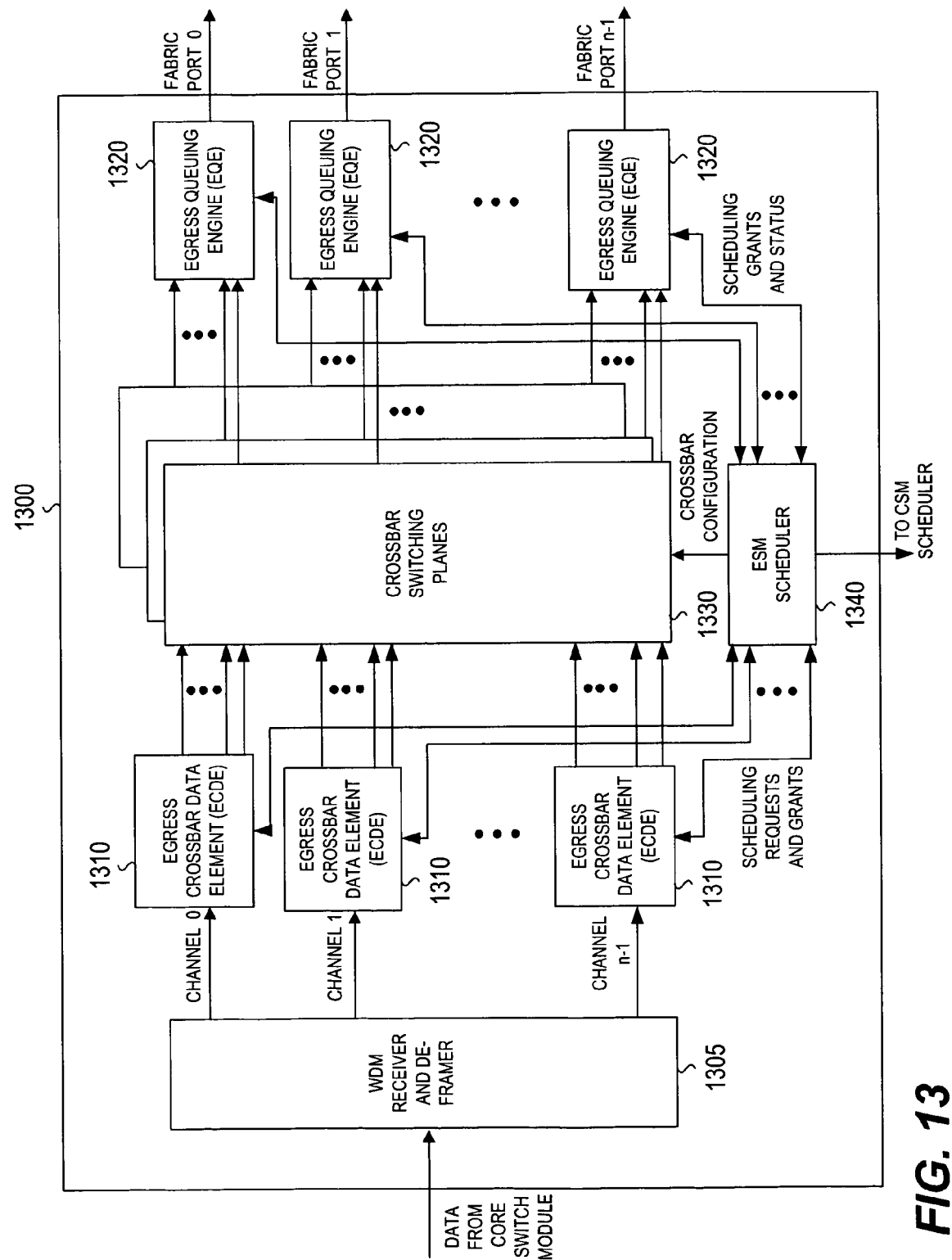
FIG. 13 illustrates an exemplary block diagram of an Egress Switch Module (ESM), according to one embodiment.

FIG. 13 illustrates an exemplary block diagram of an ESM 1300. The ESM 1300 includes a WDM receiver and de-framer (WRF) 1305, a plurality of Egress Crossbar Data Elements (ECDEs) 1310, a plurality of Egress Queuing Engines (EQEs) 1320, crossbar switching plane(s) 1330, and an ESM scheduler 1340. The ECDEs 1310 are ingress queuing devices and the EQEs 1320 are egress queuing devices.

Data arrives from the CSM as framed segments into the ESM 1300. The individual channels containing the CSM Frame Slices are separated by the WRF 1305. The Frame Slices are then forwarded to the corresponding ECDE 1310. The ECDE 1310, on receiving a Frame Slice, extracts the packet segments from the frame, and queues them in a set of queues based on the destination fabric port number. In addition, the packets destined to a specific fabric port can further be distributed into multiple queues based on their class of service or relative priority level.

The crossbar switch 1330, which may be an electrical switch and may comprise one or more crossbar switching planes, connects the ECDEs 1310 to the EQEs 1320. This crossbar, in one embodiment, may be identical to that used in ISM, and may have a "pass-through" data path. Information is transmitted by the ECDEs 1310 over the crossbar planes 1330 in the form of framed segments.

The ESM scheduler 1340 is responsible for setting up the crossbar data paths within the ESM 1300 during each frame time. The ECDEs 1310 transmit information on the segments waiting in its queues to the ESM scheduler 1340 during each frame time. Information transmitted from the ECDEs 1310 to the scheduler 1340 in each frame time can be regarded as a set of requests from the ECDEs 1310 for use of the crossbar datapaths 1330. The requests sent from the ECDE 1310 to the ESM scheduler 1340 during each frame period are formatted in the form of a request frame.

Figure 14:
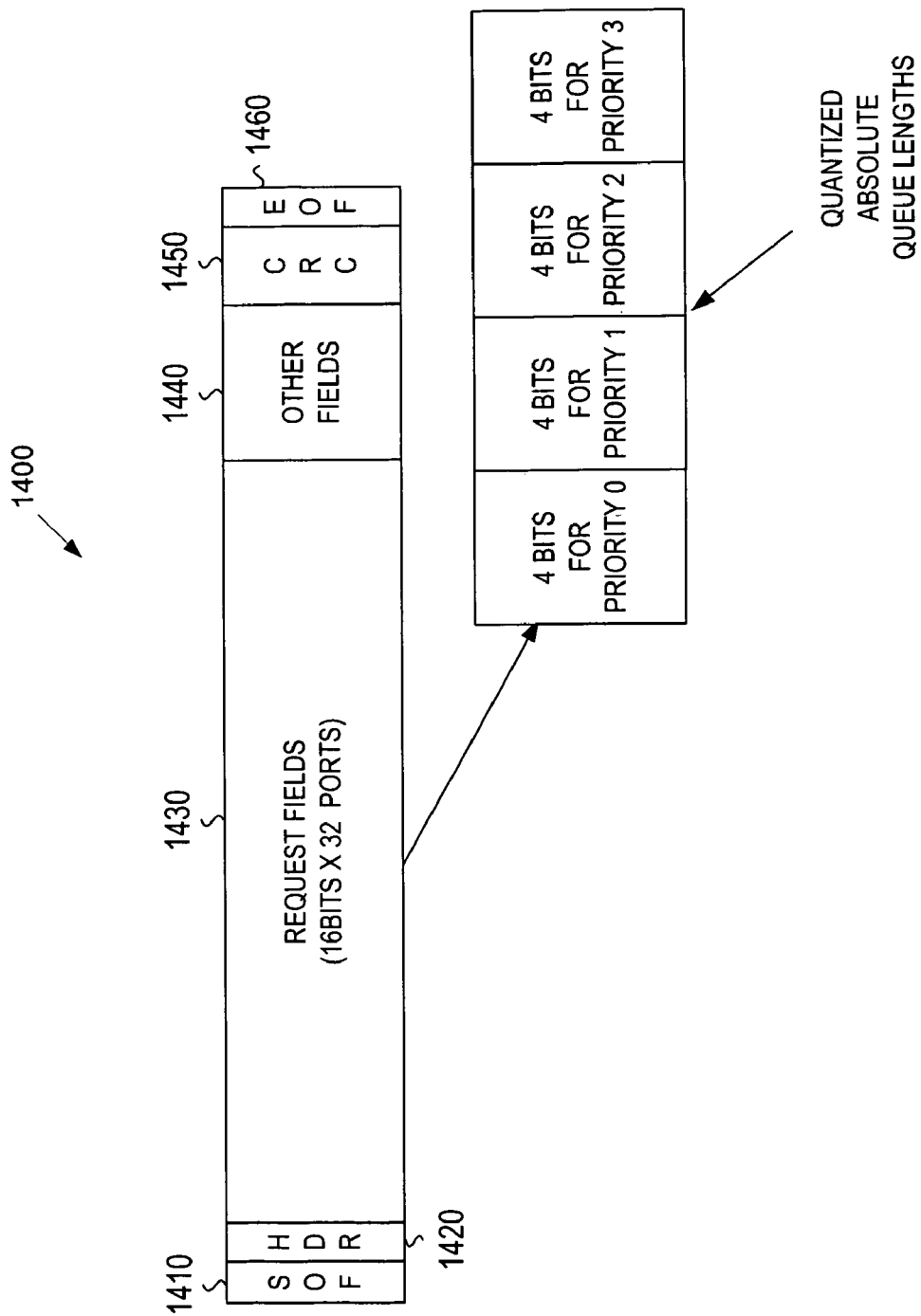
FIG. 14 illustrates an exemplary ESM request frame, according to one embodiment.

FIG. 14 illustrates an exemplary request frame 1400. The request frame 1400 includes start of frame (SOF) delimiter 1410, a header 1420, a plurality of request fields 1430, other fields 1440, a CRC 1450, and an end-of-frame (EOF) delimiter 1460. The request fields 1430 comprise a set of requests, one per destination fabric port and priority level. The requests may summarize, for example, the amount of data queued for the corresponding destination port and priority level. These length fields can be quantized as explained before with respect to the ISM. The start of frame (SOF) delimiter 1410, the header 1420, the other fields 1440, the CRC 1450, and the end-of-frame (EOF) delimiter 1460 are for the same functions already mentioned.

Referring back to FIG. 13, based on the request frames received the ESM scheduler 1340 generates a schedule. The schedule is computed by performing a matching of the requests received from the ECDEs 1310 and resolving any conflicts between ECDEs 1310. For a given EQE 1320, the scheduler 1340 normally gives preference to ECDEs 1310 having higher priority requests in the matching process. The scheduler 1340 sets the priority of the request to be highest priority data that will go as part of the frame. For example: if the request fields for a given EQE 1320 from an ICDE 1310 indicates 0.25 frame queued at priority 1 and 1.00 frame queued at priority 2, then the ESM scheduler 1340 uses the higher of the two (priority 1) in making scheduling decisions.

Once the ESM scheduler 1340 completes selection of the EQE 1320 for matching with the ECDEs 1310, this information is sent in the form of a grant to the ECDEs 1310. The grant information sent to the ECDEs 1310 contains identification of the EQE 1320 to which data is to be sent and the starting priority from which to de-queue. The grant information is sent by the ESM scheduler 1340 in a grant frame similar to the request frame it receives from the ECDEs 1310. Grant frames may contain two grant messages: one grant message for the ECDE 1310 and the other for the EQE 1320. The message to the ECDE 1310 identifies the EQE 1320 it should be sending data to. The message to the EQE 1320 identifies the ECDE 1310 it should be receiving data from. If both the ECDE 1310 and the EQE 1320 for the same index are packaged together (in the same chip or board), these two messages could be combined into a single grant frame.

Figure 15:
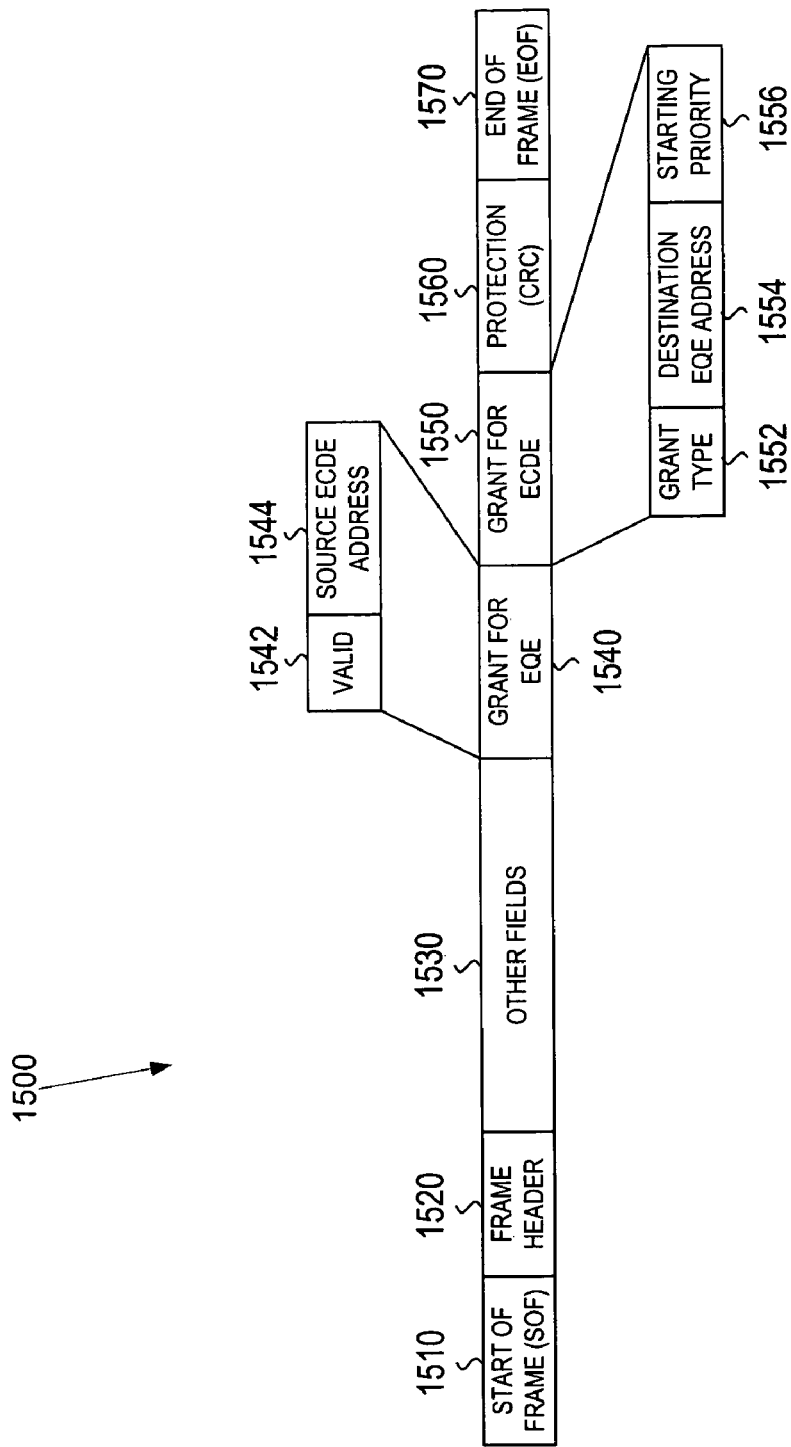
FIG. 15 illustrates an exemplary ESM grant frame, according to one embodiment.

FIG. 15 illustrates an exemplary combined (grants for ECDE and EQE) grant frame 1500. The grant frame 1500 includes a start of frame (SOF) delimiter 1510, a header 1520, other fields 1530, an EQE grant 1540, an ECDE grant 1550, a CRC 1560, and an end-of-frame (EOF) delimiter 1570. The EQE grant 1540 includes a valid bit 1542 (to indicate field is valid) and a source ECDE address (ECDE that the EQE should be receiving data from). The ECDE grant 1550 includes a grant type 1552 (specifies type of grant), a destination EQE address 1554 (EQE that the ECDE should be sending data to), and a starting priority level 1556 (priority level at which de-queuing should start).

Referring back to FIG. 13, the ESM scheduler 1340 sets the crossbar planes 1330 to correspond to the schedule (grants). Upon receiving the grants, the ECDE 1310 de-queues data from the associated queue(s) and transmits them to the crossbar data planes 1330. The ESM scheduler 1340 can be pipelined into various stages, if desired, as discussed above.

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" or "in an embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A method comprising:
receiving data packets at a multistage switch, wherein the multistage switch includes a plurality of ingress switching modules, a core switching module operationally connected to the plurality of ingress switching modules, and a plurality of egress switching modules operationally connected to the core switch module;
switching the data packets through the plurality of ingress switching modules, wherein said switching the data packets through a plurality of ingress switching modules includes
storing the data packets in a plurality of queues;
forming frames from the data packets in queues selected for switching; and
switching the frames from ingress queuing engines to ingress crossbar data elements;
forming, in the plurality of ingress switching modules, core frames from the data packets switched through the plurality of ingress switching modules;
combining, in the plurality of ingress switching modules, a plurality of the core frames into a wavelength division multiplexed signal;
switching the wavelength division multiplexed signal through the core switch module;
separating, in the plurality of egress switching modules, the plurality of the core frames from the wavelength division multiplexed signal;
extracting, in the plurality of egress switching modules, the data packets from the plurality of the core frames;
switching the data packets extracted from the plurality of the core frames through the plurality of egress switching modules; and
transmitting the switched data packets from the plurality of egress switching modules.

2. The method of claim 1, wherein said switching the data packets through a plurality of ingress switching modules further includes
sending requests to an ingress scheduler, wherein the requests are for permission to switch the data packets from the ingress queuing engines to the ingress crossbar data elements;
generating a schedule based on the requests; and
transmitting grants to the ingress queuing engines based on the schedule.

3. A method comprising:
receiving data packets at a multistage switch, wherein the multistage switch includes a plurality of ingress switching modules, a core switching module operationally connected to the plurality of ingress switching modules, and a plurality of egress switching modules operationally connected to the core switch module;
switching the data packets through the plurality of ingress switching modules;
forming, in the plurality of ingress switching modules, core frames from the data packets switched through the plurality of ingress switching modules;
combining, in the plurality of ingress switching modules, a plurality of the core frames into a wavelength division multiplexed signal;
switching the wavelength division multiplexed signal through the core switch module;
separating, in the plurality of egress switching modules, the plurality of the core frames from the wavelength division multiplexed signal;
extracting, in the plurality of egress switching modules, the data packets from the plurality of the core frames;
switching the data packets extracted from the plurality of the core frames through the plurality of egress switching modules, wherein said switching the data packets through a plurality of egress switching modules includes
storing the data packets in a plurality of queues;
forming frames from the data packets in queues selected for switching; and
switching the frames from egress crossbar data elements to egress queuing engines; and
transmitting the switched data packets from the plurality of egress switching modules.

4. The method of claim 3, wherein said switching the data packets through a plurality of egress switching modules further includes
sending requests to an egress scheduler, wherein the requests are for permission to switch the data packets from the egress crossbar data elements to the egress queuing engines;
generating a schedule based on the requests; and
transmitting grants to the egress crossbar data elements based on the schedule.

5. A store and forward device comprising:
a plurality of Ethernet cards to receive data packets from and transmit data packets to external sources; and
a multistage switch to switch the data packets between the plurality of Ethernet cards, the multistage switch including a plurality of ingress switch modules, wherein each ingress switch module includes a plurality of ingress queuing engines to receive the data packets from the plurality of Ethernet cards and to form frames from the data packets, at least one ingress crossbar switch plane to switch the data packets within the frames through the ingress switch module, a plurality of ingress crossbar data elements to extract the switched data packets from the switched frames, and a framer to create core frames from the switched data packets, and to combine a plurality of the core frames into a wavelength division multiplexed signal;

a core switch module operatively connected to receive the wavelength division multiplexed signals from the plurality of ingress switch modules and to switch the wavelength division multiplexed signals therethrough; and a plurality of egress switch modules, wherein each egress switch module is to receive the wavelength division multiplexed signals from the core switch module, to separate the core frames from the wavelength division multiplexed signals, to extract the data packets from the core frames, to form frames from the data packets, to switch the data packets within the frames therethrough, to extract the switched data packets from the switched frames, and to transmit the data packets to the plurality of Ethernet cards.

6. The device of claim 5, wherein each ingress switch module further includes an ingress scheduler operationally connected to receive requests from the at least one ingress queuing engine and to configure the at least one crossbar switch plane based on a schedule arbitrated based on received requests.

7. The device of claim 5, wherein said core switch module comprises an optical crossbar switch plane to switch the WDM signals.

8. The device of claim 5, wherein the plurality of egress switch modules include a deframer to receive the WDM signal, extract the CSM frames therefrom, and extract segments from the CSM frames;

at least one egress crossbar data element operatively connected to receive the segments from the deframer, store the segments in associated queues, and form ESM frames for selected queues;

at least one crossbar switch plane operatively connected to receive the ESM frames from the at least one egress crossbar data element;

at least one egress queuing engine to receive the ESM frames from the at least one crossbar switch plane; and an egress scheduler operationally connected to receive requests from the at least one egress crossbar data element and to configure the at least one crossbar switch plane based on a schedule arbitrated based on received requests.

9. A multi-stage switch fabric comprising:

a plurality of ingress switch modules, wherein each ingress switch module is to receive data packets via a plurality of ingress ports, to form frames from the data packets, to switch the data packets within the frames therethrough, to extract the switched data packets from the switched frames, to create core frames from the switched data packets, and to combine a plurality of the core frames into a wavelength division multiplexed signal;

a core switch module operatively connected to receive the wavelength division multiplexed signals from the plurality of ingress switch modules and to switch the wavelength division multiplexed signals therethrough; and a plurality of egress switch modules, wherein each egress switch module includes a deframer to receive the wavelength division multiplexed signals from the core switch module and to separate the core frames from the wavelength division multiplexed signals, a plurality of egress crossbar data elements to extract the data packets from the core frames and to form frames from the data packets, at least one egress crossbar switch plane to switch the data packets within the frames through the egress switch module, and a plurality of egress queuing engines to extract the switched data packets from the switched frames and to transmit the data packets via a plurality of egress ports.

10. The switch of claim 9, wherein the plurality of ingress switch modules include a plurality of ingress queuing engines, a plurality of ingress crossbar data elements, at least one ingress crossbar switch plane to selectively connect the plurality of plurality of ingress queuing engines and the plurality of ingress crossbar data elements, and an ingress scheduler to control the at least one ingress crossbar switch plane.

11. The switch of claim 10, wherein the plurality of ingress switch modules further include a framer and wavelength division multiplexer transmitter.

12. The switch of claim 10, wherein the ingress scheduler includes an ingress crossbar data element array that tracks data stored in the plurality of ingress crossbar data elements.

13. The switch of claim 12, wherein the ingress scheduler configures the at least one ingress crossbar switch plane so that data packets destined for one of the plurality of egress switch modules are transmitted from the plurality of ingress queuing engines as evenly as possible to the plurality of ingress crossbar data elements.

14. The switch of claim 10, wherein the plurality of ingress queuing engines store the received data packets as segments and form ingress frames from the segments and transmit the ingress frames over the at least one ingress crossbar switch plane.

15. The switch of claim 13, wherein the segments are stored in a plurality of queues, wherein the queues are based on at least egress switch module the data packets are destined for.

16. The switch of claim 10, wherein the plurality of ingress crossbar data elements divide the received ingress frames into the segments and store the segments in queues based on at least egress switch module the data packets are destined for.

17. The switch of claim 16, wherein the ingress crossbar data elements form the core frames from the segments associated with one of the plurality of egress switch modules and combine the core frames associated with the one of the plurality of egress switch modules into the wavelength division multiplexed signal.

18. The switch of claim 9, wherein the wavelength division multiplexed signals are switched utilizing multiple channels in the core switch module.

19. The switch of claim 18, wherein wave division multiplexing is used to form the multiple channels.

20. The switch of claim 9, wherein said core switch module comprises an optical crossbar switch plane.

21. The switch of claim 9, wherein the plurality of egress switch modules further include an egress scheduler to control the at least one egress crossbar switch plane.

22. The switch of claim 21, wherein the plurality of egress crossbar data elements store the extracted data packets as segments and form egress frames from the segments and transmit the egress frames over the at least one egress crossbar switch plane.

23. The switch of claim 9, wherein the at least one ingress switch module, the core switch module, and the at least one egress switch module are controlled by separate schedulers.

24. The switch of claim 23, wherein at least some subset of the schedulers operate on a pipeline schedule.

25. The switch of claim 9, wherein the plurality of ingress switch modules include a plurality of ingress interface modules to receive the data packets, store the data packets as segments in associated queues, form ISM frames for selected queues, and transmit the ISM frames, wherein the queues are associated with at least some subset of destination and priority of the data packets;

a scheduler to receive requests from at least some subset of the plurality of ingress interface modules and to generate a schedule;

a plurality of egress interface modules to receive the ISM frames, extract the segments from the ISM frames, and store the segments in associated queues, wherein the queues are associated with at least some subset of destination and priority;

an ingress crossbar switch, responsive to the scheduler, to selectively connect the plurality of ingress interface modules and the plurality of egress interface modules; and a framer to receive the segments from at least some subset of the plurality of egress interface modules, form CSM frames from the segments, create the wavelength division multiplexed signal from the CSM frames, and transmit the wavelength division multiplexed signal.

26. The switch of claim 9, wherein said plurality of egress switch modules further include a scheduler to receive requests from the plurality of ingress interface modules and to generate a schedule; and wherein the egress crossbar switch is responsive to the scheduler to selectively connect the plurality of ingress interface modules and the plurality of egress interface modules.

* * * * *